United States Patent
Dammig, Jr. et al.

[15] 3,639,835
[45] Feb. 1, 1972

[54] CAPACITIVE TANK GAGING APPARATUS BEING INDEPENDENT OF LIQUID DISTRIBUTION

[72] Inventors: Alvin H. Dammig, Jr., Readville; Arthur E. Sherburne, Bedford; Rodney A. Brooks, Lexington, all of Mass.

[73] Assignee: National Aeronatuics and Space Administration under the provisions of 42 U.S.C. 2457(d)

[22] Filed: Jan. 27, 1967

[21] Appl. No.: 612,265

[52] U.S. Cl. ................................................. 324/61, 73/304
[51] Int. Cl. ............................... G01r 27/26, G01j 23/00
[58] Field of Search ................... 324/61, 61 P, 61 LP, 61 LL; 73/304, 304 C; 317/246

[56] References Cited

UNITED STATES PATENTS 2,357,023   8/1944   Reid et al. ............................... 73/304
3,377,861   4/1968   Thaler et al. ............................ 73/304

FOREIGN PATENTS OR APPLICATIONS

836,614   6/1960   Great Britain ........................... 73/304

*Primary Examiner*—Edward E. Kubasiewicz
*Attorney*—Leonard Rawicz, Alvin S. Bass, Leon D. Wofford and George D. Porter

[57] ABSTRACT

Capacitive gaging apparatus for fluid measurement. Longitudinally extending electrodes are circumferentially disposed on the interior of an elongated container or conduit and energized by a time variable signal to generate a uniform electric field across the container or conduit. In one embodiment, transverse fields are generated across the container. Changes in energizing current are converted to indicate liquid quantity or density. The electrodes may be shielded, formed of variable widths and energized to produce at least alternately orthogonal electric fields to obtain maximum accuracy.

9 Claims, 10 Drawing Figures

CAPACITIVE TANK GAGING APPARATUS BEING INDEPENDENT OF LIQUID DISTRIBUTION

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435, 42 U.S.C 2457).

BACKGROUND

This invention relates to capacitive gaging equipment having the particular capability of measuring the quantity of liquid distributed anywhere throughout a tank, conduit or other container. The gaging equipment is also capable of monitoring the density of liquid flowing in a conduit without obstructing the flow.

Capacitive gaging equipment utilizes the fact that the density of a dielectric liquid is directly related to its dielectric constant. Because of this relationship, the capacitance between two electrodes separated by a space filled with liquid and a gas of known characteristics is a measure of the quantity of liquid present. In the past, capacitive gages have been built with various configurations to measure the mass or volume of liquid in a container.

However, prior art capacitive gages are suited for accurate measurements only where the liquid is restricted to the bottom portion of a container or is otherwise distributed uniformly throughout at least a certain part of the measured volume. As the liquid propellant in a space vehicle, for example, is consumed, when the vehicle is in or near a zero-gravity environment, the propellant may become randomly distributed in the tank. Also, the propellant readily moves due to surface tensions and capillary flow becomes pronounced. The quantity of propellant remaining in the tank then can not be measured accurately with conventional capacitive gages.

Accurate mass measurements are also often difficult to obtain in a gravity environment in containers subject to movement, such as is encountered in vehicles, that causes the liquid to slosh or tumble.

One possible exception is to measure the propellant with an array of capacitive sensors distributed throughout the container volume. However, this requires an excessive number of sensors to attain reasonable accuracy. Hence, this multiple-sensor gaging system is costly to fabricate. Further, the bulk of the many sensors and their support structure tends to be excessive. Also, the sensors are required throughout the container volume, and they tend to hold the propellant about them due to surface tension. This is often undesirable.

There are prior devices that can determine the quantity of propellant in a space vehicle indirectly, from measurements made on the vapor ullage. For example, when a known compression is applied to the tank contents, the resultant change in pressure identifies the volume of the ullage, since only the vapor is compressible. There are other techniques that also identify to the volume of the ullage. However, these indirect measurements of the quantity of remaining propellant have material shortcomings. One is that the sensitivity decreases as the quantity of propellant decreases.

The alternative is to measure the propellant mass directly, as by directing penetrating radiation into the tank interior. An array of detectors can provide information regarding the amount of radiation absorbed and scattered by the propellant and hence identify the quantity remaining. This technique also, however, has substantial disadvantages, including radiation hazards and relatively large mass. Other known techniques for directly measuring the quantity of propellant also have serious shortcomings.

Turning to another problem, accurate monitoring of the density of fluid material in a pipe is relatively difficult, as is the accurate measurement of the quality, i.e., ratio of gas mass to total (gas plus liquid) mass, of the flow. Nuclear radiation gaging techniques involve weight equipment and introduce a safety hazard. And prior capacitive gages have generally required electrodes in the flow path, which undesirably obstructs the flow.

Accordingly, it is an object of the present invention to provide improved apparatus for monitoring a contained or guided fluid by sensing its dielectric constant.

A further object is to provide measuring apparatus of the above character that does not require structures within the body of the fluid.

A more specific object of the invention is to provide apparatus for monitoring one constituent of a two-phase fluid in which the liquid constituent and gaseous constituent are randomly distributed.

Another object of the invention is to provide a capacitive gage having the above capabilities. A further object is to provide capacitive gaging apparatus capable of measuring the quantity of liquid in a container, conduit or like structure, with the measurement being essentially independent of the distribution of the liquid.

Further objects of the invention are to provide a capacitive gaging system of the above character that is relatively accurate and, in particular, that measures each incremental volume element within the fluid container. Moreover, the system should measure different volume elements with substantially equal weight.

Further, the measuring system should not materially influence the position of the liquid, and it should be relatively light weight, electrically simple, compact, and reliable.

Other objects of the invention will in part be obvious and will in part appear hereinafter.

The invention accordingly comprises the features of construction, combinations of elements, and arrangements of parts exemplified in the constructions hereinafter set forth, and the scope of the invention is indicated in the claims.

DESCRIPTION OF FIGURES

For a fuller understanding of the nature and objects of the invention, reference should be had to the following detailed description taken in connection with the accompanying drawings, in which.

SUMMARY OF INVENTION

The new capacitive gage of this invention produces an electric field that is relatively uniform throughout the container volume. The uniform field provides an approximately constant response to a given mass of liquid regardless of its location within the volume. The errors that do result due to propellant location and distribution can be reduced by the use of a second uniform field transverse to the first field. The responses with the two field orientations are averaged and the result is largely independent of spatial factors encountered with either field alone. The orthogonal fields can be applied on a time-sharing or a frequency-sharing basis.

The resultant gage measures the quantity of liquid in the container with high accuracy, even when the liquid is randomly distributed, as it might be in a zero-gravity environment. The uniform field also makes it possible for the gage to measure the quality, i.e., the mass ratio of liquid to gas, of a nonuniform liquid-gas mixture flowing in a pipe.

The gage develops the uniform fields with an array of electrodes mounted on the inner surface of the fluid-containing structure. The electrodes are thus at boundaries of the fluid volume and do not influence the distribution of the liquid within the container; when the container is a pipe, they do not obstruct the flow.

The gaging system operates essentially identically when the liquid is under a zero-gravity environment as when it is in a gravity environment or subjected to an accelerating force.

DESCRIPTION OF PREFERRED EMBODIMENTS

Figures 1, 1A, 2:
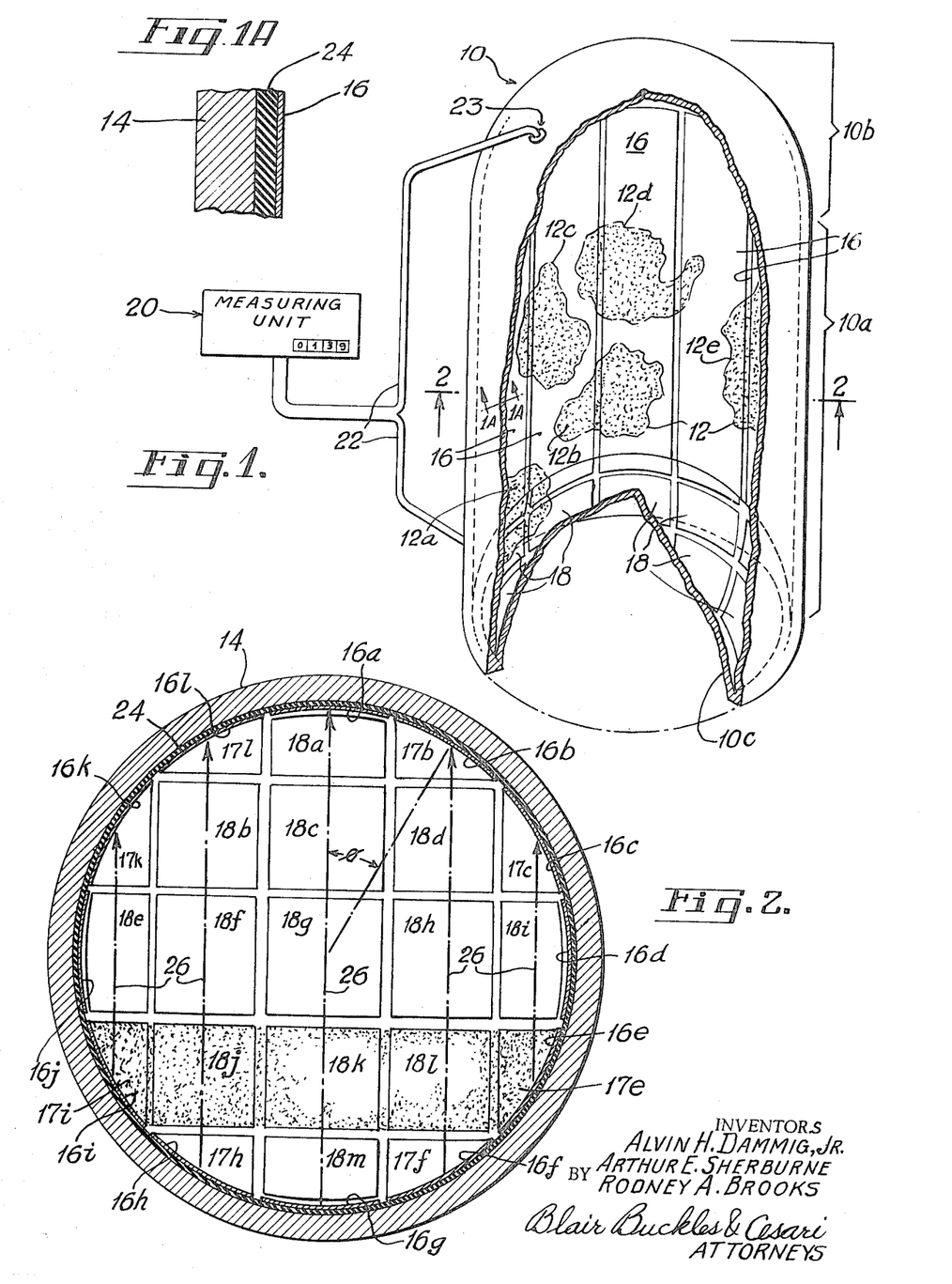
FIG. 1 is a pictorial representation of a liquid storage system having a gaging system embodying the invention.
FIG. 1A is a partial section of the storage system taken along lines 1A—1A of FIG. 1.
FIG. 2 is a transverse pictorial view of the tank of FIG. 1 taken along line 2—2.

More particularly, referring to FIG. 1, a space craft typically has a tank 10 storing a liquid propellant 12 such as liquid oxygen. The ullage of the tank is filled with the propellant vapor and, perhaps, other gases. The illustrated tank has cylindrical center section 10a, a concave spherical end section 10b closing one end of the cylindrical section and a convex spherical end section 10c closing the other end. As is conventional, the tank 10 is fitted with various inlets, outlets and other fittings for the liquid propellant, as well as pressure vents and the like which are not shown and do not form part of the invention.

When the tank 10 is in a gravity field or subjected to accelerating forces, the propellant will be at the "bottom" of the tank and the ullage will be entirely above the propellant. However, as illustrated, in a space environment of zero or near zero gravity, the propellant 12 is randomly distributed, and may be in several globules 12a–12e, separated by vapor.

In accordance with the invention, the quantity of propellant in the tank 10 is measured with a capacitive gaging system that includes strip electrodes 16 and spot electrodes 18 distributed over the inner surface of the tank. Cables 22 connect a measuring unit 20 to the electrodes 16 and 18; the connection is made to the end section 10b with a feed-through connector 23.

The strip electrodes 16 are elongated conductive ribbons arrayed around the circumference of the cylindrical tank section and parallel to its longitudinal axis. The spot electrodes 18 are differently sized conductive sheets distributed over the inner surfaces of the end sections 10b and 10c. As shown in FIG. 1A, the metallic tank wall 14 has an insulating sheet 24, suitably of synthetic plastic, bonded to its inner surface in the cylindrical section. The electrodes 16 are bonded on the inner surface of this sheet.

With further reference to FIG. 1, the measuring unit 20 impresses different voltages on the various electrodes 16 and 18 in a manner that generates relatively uniform time-varying electric fields across the tank transverse to the longitudinal axis of the cylindrical section 10a. The measuring unit senses the capacitive current through the tank interior between the electrodes.

This current is a measure of the electrical capacity of the tank volume for the amount of liquid and gas present. Hence it is a function of the dielectric constants of the fluids in the tank. The liquid has a different dielectric constant from the vapor, the dielectric constant of which is known at least within a narrow range. Also, the tank volume is known. Hence, the measured current varies with the quantity of liquid. The measuring unit is, accordingly, readily calibrated to indicate the quantity of liquid. The illustrated measuring unit displays this information with a digital readout. Alternatively, the information can be recorded, transmitted to remote equipment, or processed in other conventional manners.

As is often desired, the present gage structure has essentially no effect on the propellant distribution, even in zero and low acceleration fields. This is because the sensing devices of the present gaging system, i.e., the electrodes 16 and 18, form part of the tank surface bounding the contents. There is no gaging structure in the tank interior. In particular, there are no closely spaced capacitor electrode surfaces as found in prior capacitive tank gages. Therefore, capillary movement is at a minimum.

As shown in FIGS. 1 and 2, the illustrated tank 10 has 12 strip electrodes 16 of uniform width evenly spaced around the cylindrical section 10a. The number of strip electrodes is an integral multiple of four and they are arrayed with 90° symmetry about the cylindrical tank axis to enable them to be energized in two modes to produce two orthogonal electric fields.

A larger number of strip electrodes generally results in a more uniform filed. However, it increases the complexity and cost of the structure. Correspondingly, with fewer electrodes, the field uniformity generally decreases, which decreases the measuring accuracy. In applications where the field direction is not changed, a smaller number of electrodes may provide sufficient accuracy.

As indicated in FIG. 2, each strip electrode 16 is relatively wide compared with the gap to the adjacent strip electrode. As an illustration, a suitable ratio of strip electrode width to gap width is 20:1.

The illustrated measuring unit 20 energizes the strip electrodes 16 with an alternating voltage distributed according to a cosine distribution. That is, the voltage $V_i$ applied to each electrode is $$V_i = V_o \cos \phi_i \qquad (1)$$

where $V_o$ is one-half the voltage applied between the two opposed strip electrodes having the maximum separation parallel to the electric field, and $\phi_i$ is the angle about the tank axis from the diameter parallel to the field to the midpoint of the electrode (i) whose potential is being determined.

For example, in FIG. 2, for a field having lines of force 26 parallel to the diameter between the midpoints of opposed electrodes 16a and 16g, the maximum voltage ($2V_o$) is applied between these electrodes 16a and 16g. The voltage at each electrode 16b and 16l adjacent the electrode 16a has the value ($V_o \cos \phi$) for the angle $\phi$ shown. (The force lines 26 represent an ideal uniform field; the field attained in actual practice has some nonuniformities.)

Thus, with the cosine voltage distribution and the illustrated strip electrode arrangement, except for the electrodes 16a and 16g diametrically opposed parallel to the force lines 26, each strip electrode is opposite another strip electrode along a chord transverse to the force lines 26. And each electrode in such a pair of opposed electrodes receives the same voltage from the measuring unit. For example, the electrodes 16c and 16k are opposite each other along a chord transverse to the field lines 26 and are excited with identical voltages.

The cosine voltage distribution of Eq. (1) is the theoretical ideal for a container of circular cross section assuming an infinite number of strip electrodes, i.e., it defines the voltages a uniform, diametrically oriented field develops along a circle. The cosine function also is generally at least a first order approximation of the voltage distribution required to produce a uniform field with a relatively small number of electrodes. Of course, in some instances, it may be desirable to vary the voltage distribution slightly from the cosine function to improve the uniformity of the electric field.

With further reference to FIGS. 1 and 2, the spot electrodes 18 in the tank end section 10b are arranged so that they can be energized with the same voltages that are applied to the strip electrodes to produce the desired uniform field. More particularly, each spot electrode is confined to a crossover band formed by the path extending, on the container inner surface, between two strip electrodes opposite each other along a chord transverse to the field lines 26. Thus, the spot electrode 18a is in the band defined by the pair of opposed electrodes 16b and 16l, and the three spot electrodes 18j, 18k and 18l are in the crossover band between the strip electrodes 16e and 16*i*. To produce the field having force lines 26, each spot electrode can be excited with the voltage having the same phase and magnitude that is applied to each of the two strip electrodes with which the spot electrode is aligned. This is because the equipotential surfaces of an ideal uniform electric field having the force lines 26 are the same in the end sections of the tank as in the tubular section. That is, an ideal uniform field has the same potential anywhere in a surface through the field transverse to the lines of force.

Further, where the tank is to be subjected to only the field having force lines 26, the spot electrodes illustrated in FIG. 2 lying in the same crossover band, e.g., the three electrodes 18*j*, 18*k* and 18*l*, or the five electrodes 18*e*, 18*f*, 18*g*, 18*h* and 18*i*, would preferably constitute part of a single, unitary spot electrode interconnecting the two opposed strip electrodes defining that crossover band. For example, to produce only this single field, one unitary spot electrode would cover the stippled area (FIG. 2) between the strip electrodes 16*e* AND and 16; and encompassing the illustrated spot electrodes 18*j*, 18*k* and 18*l*.

On the other hand, where the tank interior is to be subjected to two orthogonal fields, the spot electrodes are confined to the intersections of the two sets of crossover bands for the two fields. Thus, the spot electrode 18*h* lies at the intersection of the crossover band between strip electrodes 16*d* and 16*j* with the band between strip electrodes 16*b* and 16*f*. The latter two strip electrodes are opposite each other along a chord transverse to a second uniform electric field orthogonal to the field having the force lines 26.

The spot electrodes on the other end section 10*c* have the same arrangement as just described for the end section 10*b*.

The configuration of spot electrodes 18 and strip electrodes 16 described above and receiving voltages as described above produces a uniform electric field throughout the tank interior. In fact, the electrode configuration and voltage distribution produces substantially the same field in the tank as would result if the tank had dielectric walls and was placed between the parallel-plate electrodes receiving between them a voltage that produces the same gradient as the voltage ($2V_o$) applied between the two maximally spaced strip electrodes 16*a* and 16*g*. As a result of this uniform field, like masses of propellant are sensed equally regardless of their location in the tank. This enables the gaging equipment to obtain an accurate measurement of the propellant quantity in both gravity and zero-gravity environments.

The spot electrode configuration determined in the foregoing manner is often preferred over other arrangements because it provides a relatively uniform field, and hence good measuring accuracy, with a small number of electrodes. Further, the spot electrodes are arranged to operate with the same voltages as are applied to the strip electrodes, thereby reducing the number of voltages required and simplifying the circuitry.

As also shown in FIG. 2, it is often advantageous to provide additional triangularly shaped corner electrodes 17 on each end section in the larger voids between the spot electrodes 18 and the strip electrode 16. Each corner electrode 17 can be an extension of the adjacent strip electrode 16 or connected to it to operate as an extension. Thus, the corner electrode 17*b* which is roughly aligned with the spot electrode 18*a* and with the row of spot electrodes 18*d*, 18*h* and 18*l*, is preferably an extension of the strip electrode 16*b* from the tank cylindrical section on the end section 10*b*. The other electrodes 17 are similarly arranged.

Figures 3, 3A:
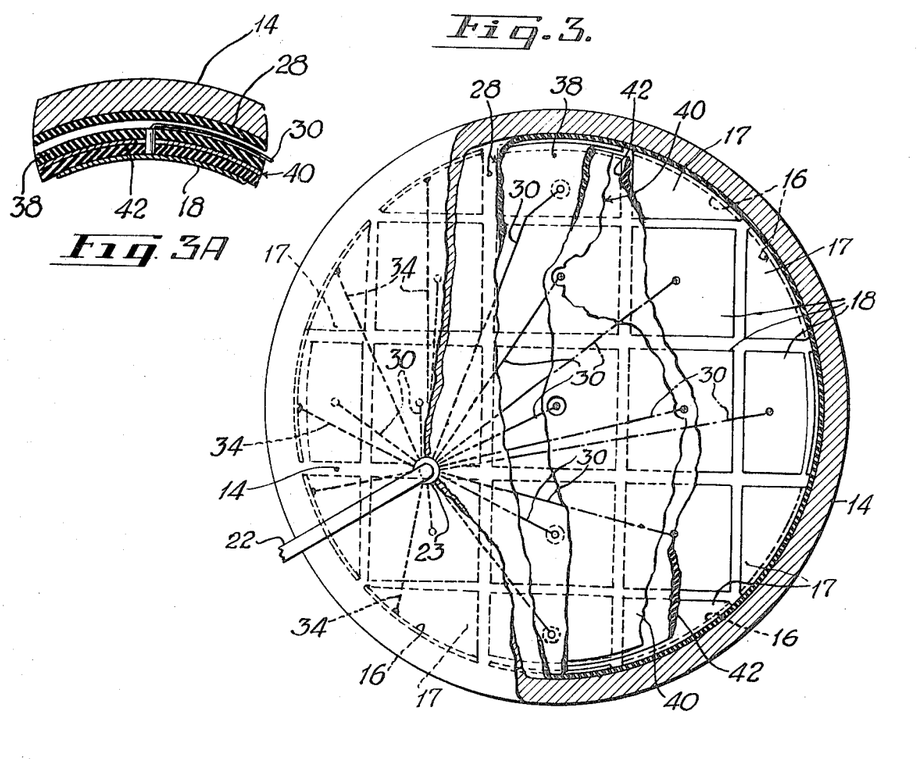
FIG. 3 is a plan view of one tank end section taken from above the tank in FIG. 1.
FIG. 3A is a partial section of a portion of an end section of the tank shown in FIG. 3.

FIGS. 3 and 3A illustrate a suitable construction for the concave hemispherical end section 10*b* of the FIG. 1 tank 10. The outer layer of the end section 10*b* is the structural tank wall 14. The inner surface of the wall 14 is covered by an outer sheet 28 of insulating material similar to the insulating sheet 24 in the cylindrical section 10*a*. A network of interconnecting conductors 30 and 34 is disposed between the inner surface of the insulating sheet 28 and an intermediate insulating sheet 38. The conductors suitably are formed with printed circuit techniques on one of these layers.

The conductors 30 fan out from the feedthrough connector 23 to a point under each spot electrode 18. The spot electrodes are connected, through additional material layers described below, to these interconnecting conductors 30. The conductors 30 thus provide a separate connection from each spot electrode 18 on the end section 10*b* to the feedthrough connector 23 where each conductor connects to a separate wire in the cable 22.

The conductors 34 extend from the feedthrough connector 23 to different strip electrodes. (For simplicity, only a few of the conductors 34 are shown.) Alternatively, these connections can be made through the corner electrodes for those strip electrodes connected to corner electrodes.

With further reference to FIGS. 3 and 3A, the intermediate insulating sheet 38 covers the network of conductors 30 and 34 and the insulating sheet 28. A continuous, grounded, sheet conductor 40 covers the inner surface of the insulating sheet 38. An inner insulating layer 42 covers this ground plane conductor 40 and has the spot electrodes 18 bonded to its inner surface.

The purpose of the grounded conductor 40 is to shield the interior of the tank from the potentials on the interconnecting conductors 30 and 34. This allows the field in the tank to be determined essentially exclusively by the potentials and geometry of the electrodes 16 and 18.

With further reference to FIGS. 3 and 3A, the end of each interconnecting conductor 30 remote from the connector 23 is connected to the spot electrode 18 above it. The connection is made through the intervening insulating sheets 42 and 38 and, with suitable insulation, through the grounded conductor 40. Thus, the connections for all the strip electrodes, and for all the spot electrodes in the end section 10*b*, are made through the connector 23.

The other tank end section 10*c* is constructed in a similar manner as the concave end section 10*b* except it only provides connections for the spot electrodes thereon. That is, the cable 22 connects to the spot electrodes on the end section 10*c* through a connector (not shown) on that end section and a network of interconnecting conductors similar to the FIG. 3 conductors 30.

Figure 4:
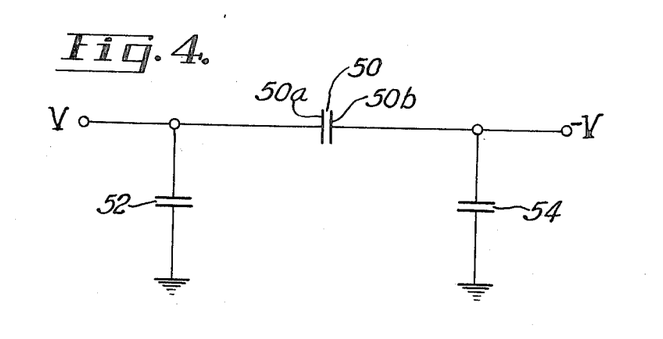
FIG. 4 is a simplified circuit illustrating the measurement made with the system of FIG. 1.

FIG. 4 illustrates, in a simplified fashion, the circuit of the capacitances involved in the capacitive gaging system of FIG. 1. The series capacitor 50 represents the combined capacitance in the tank between all the strip and spot electrodes. The value of the capacitor 50 is therefore a function of the quantity of propellant in the tank. The voltages $+V$ and $-V$ applied to the capacitor plates 50*a* and 50*b* respectively represent the voltages applied to the strip and spot electrodes to produce the uniform electric field as described above.

Further, the shunt capacitors 52 and 54 in FIG. 4 represent the capacitance from each plate of the capacitor 50 to ground. More specifically, these shunt capacitors represent capacitances to ground in the cables 22 (FIG. 1) and in the interconnecting conductors 30 and 34, and capacitances to ground from the electrodes 16 and 18. The latter capacitances are principally to the metallic tank wall 14 and to the grounded conductor in each end section, e.g., the conductor 40 in the end section 10*b*, FIG. 3.

The capacitance of each shunt capacitor 52 and 54 is generally many times larger than the capacitance of the propellant-dependent capacitor 50; in an illustrative system each shunt capacitor has of the order of 1,000 times the capacitance of the capacitor 50.

The measurement required to determine the quantity of propellant in the tank is the value of the capacitor 50. Further, the empty tank value of the capacitor 50 should be subtracted from the value of the capacitor 50 in order to provide a measure of the mass of the content of the tank. The total value $C_{50}$ of the capacitor 50 can be expressed as $$C_{50} \cong C_{50-0}[1+(k-1)(m/M)] \qquad (2)$$

where $C_{50-0}$ is the value of the capacitor 50 when the tank is empty;

$k$ is the relative dielectric constant of the liquid propellant;

$m$ is the mass of liquid propellant in the tank; and
$M$ is the mass of propellant required to fill the tank.
Thus the quantity to be measured to obtain the propellant mass is $$\Delta C_{50} \cong C_{50} - C_{50-0} \cong C_{50-0}(k-1)(m/M) \quad (3)$$

Figure 5:
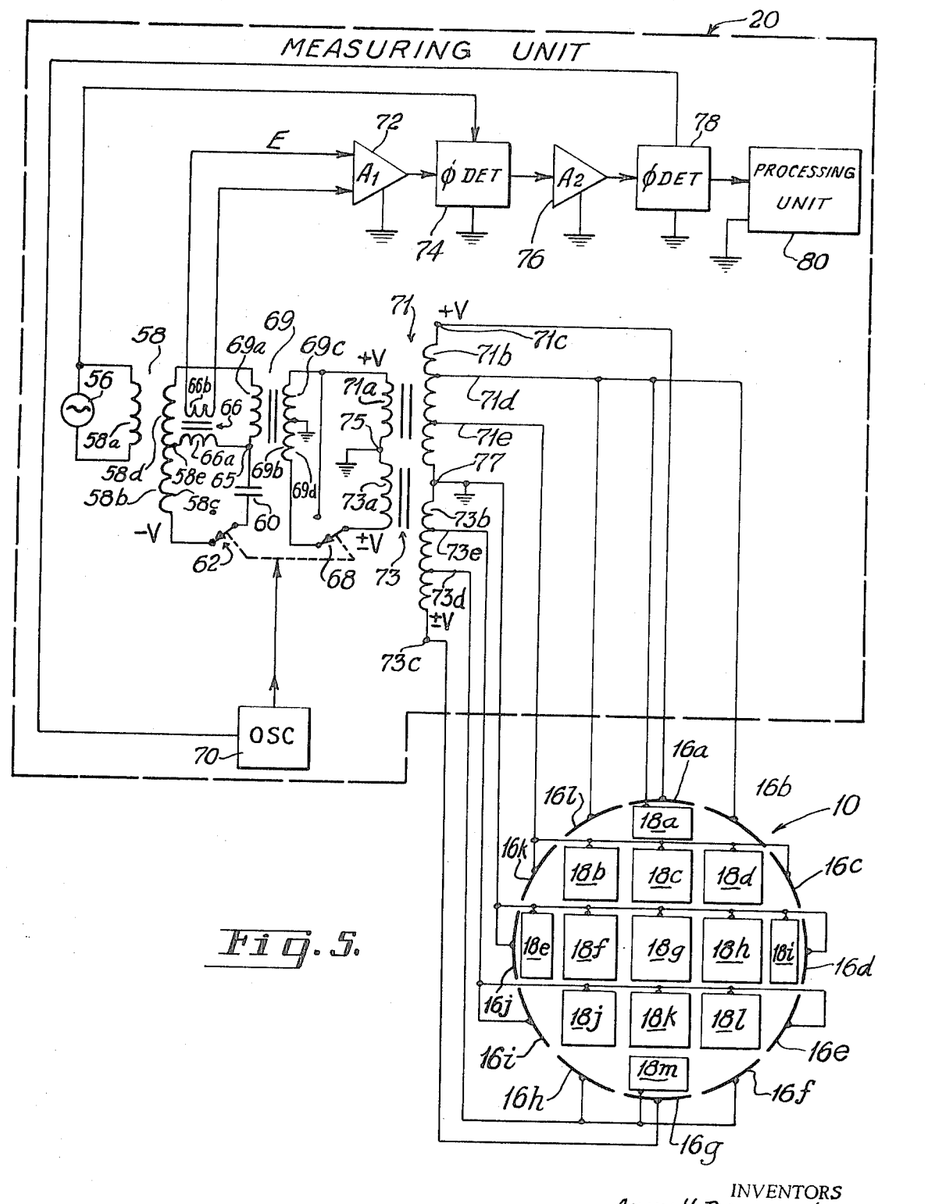
FIG. 5 is a schematic diagram of the actual measuring circuit.

FIG. 5 shows a circuit that performs the desired measurement with an electric field directed parallel to the tank diameter between the strip electrodes 16a and 16g. Each spot electrode 18a–18m in FIG. 5 represents two spot electrodes, one being in the end section 10b and the other being opposite thereto, i.e., in the corresponding position, in the other end section 10c.

An alternating source 56 connected across a transformer primary winding 58a excites the measuring circuit, preferably at a low radiofrequency. A sensing transformer primary winding 66a is in series between a terminal point 65 and a center tap 58e on the transformer secondary winding 58b. The source voltage induced across one portion 58c of the secondary winding 58b, less the drop in the winding 66a, is applied to a reference capacitor 60 through a single-pole, double-throw switch 62 when the switch is in the position shown. The reference capacitor 60 has a value of four times the value of the capacitance within the tank between the strip and spot electrodes when the tank is empty, i.e., ($4(C_{50-0})$ of FIG. 4. The factor of 4 results from transformations of the tank capacitances through the transformers 69, 71 and 73.

The source voltage induced across the other portion 58d of the secondary winding 58b is applied across the sensing transformer primary winding 66a and a transformer primary winding 69a. The secondary winding 69b of this transformer has a grounded center tap. The primary winding 71a of a further transformer 71 is in parallel with the secondary winding portion 69c. A like transformer 73 has its primary winding 73a connected between a terminal point 75 and the transfer contact of a single-pole, double-throw switch 68 ganged with the switch 62. The fixed contacts of the switch 68 are connected to the ends of the transformer secondary winding 69d as shown. Accordingly, when the switch 68 is in the position shown, the primary winding 73a receives the voltage developed across the secondary winding portion 69d. When the switch is reversed, the winding 73a is in parallel with the winding 71a and receives the voltage developed across the secondary winding portion 69c.

An oscillator 70 operates the switches 62 and 68, which preferably are semiconductor switches, at a frequency lower than the frequency of the source 56. A switching rate in the order of 1 percent of the source frequency is appropriate. For example, with a source frequency of 100 kHz. the switches 62 and 68 can be operated at 1,000 Hz.

With further reference to FIG. 5, one end terminal of each secondary winding 71b and 73b is connected to a grounded terminal point 77. The terminal point is further connected to the tank electrodes 16d, 16j, 18e, 18f, 18g, 18h and 18l, all of which are in the neutral plane for the electric field produced by the illustrated circuit. The diametrically opposed electrodes 16a and 16g, having the greatest separation parallel to this field, are connected respectively to the other end terminals 71c and 73c of the secondary windings. Hence, the voltages they receive are larger than those applied to the other electrodes. Specifically, the voltage between ground and each electrode 16a and 16m is the voltage $V_o$ in Eq. (1) above.

The tank electrodes 16b, 16l and 18a are connected in parallel to an intermediate tap 71d on the winding 71b to receive a smaller voltage than is applied to the adjacent electrode 16a. On the other side of the tank, the electrodes 16f, 16h and 18m are connected in parallel to a corresponding intermediate tap 73d on the transformer winding 73b. Finally, the electrodes 16c, 16k, 18b, 18c and 18d are together connected to further tap 71e having a smaller voltage than the tap 71d. Correspondingly, the electrodes 16e, 16i and 18j, 18k and 18l are connected to a tap 73e.

In accordance with Eq. (1), the transformer 71 develops at the tap 71d a voltage substantially equal to ($V_o \cos \phi_1$), where $\phi_1$ is the angle in the plane of FIG. 5 between the circumferential centers of the electrodes 16a and 16b. The voltage at the tap 73d has the same magnitude but opposite phase. Similarly, a voltage of ($V_o \cos \phi_2$), where $\phi_2$ is the angle between the centers of electrodes 16a and 16c, is developed at the tap 71e. An equal-magnitude, opposite-phase, voltage is developed at the tap 73e.

When the switches 62 and 68 are in the positions shown, the source voltage impressed across the secondary winding 69b is applied across the two series-connected primary windings 71a and 73a. Simultaneously, the reference capacitor 60 is excited from the transformer secondary winding portion 58c. Hence, in addition to the reference capacitor 60, all the capacitances associated with the electrodes 16 and 18 are energized. The distribution of alternating voltages applied to the electrodes produces a substantially uniform electric field within the tank with lines of force parallel to the diameter between midpoints of the electrodes 16a and 16g. The current in the sensing transformer primary winding 66a is the sum of the currents drawn by the tank capacitance, i.e., the capacitance between the electrodes, and by the shunt capacitances to ground. The current drawn by the empty tank reference capacitor 60 subtracts from these currents.

Accordingly, the voltage induced across the secondary winding 66b of the sensing transformer directly corresponds to, and hence is a measure of, (a) the capacitance between the electrodes 16 and 18 (i.e., the capacitor 50 in FIG. 4) plus (b) the shunt capacitances (i.e., the FIG. 4 capacitors 52 and 54) less (c) the empty tank capacitance between the electrodes (i.e., $C_{50-0}$.)

When the oscillator 70 reverses the switches 62 and 68 from the positions shown in FIG. 5, the reference capacitor 60 is shorted out and only the voltage across the secondary winding portion 69c is used. It is impressed across both the winding 71a and the winding 73a. The voltages at the transformer terminal 73c and taps 73d and 73e now have the same phase, as well as magnitude, as the respective voltages at the terminal 71c and taps 71d and 71e. This corresponds to applying the same voltage to each plate 50a and 50b of the FIG. 4 capacitor 50. As a result, the currents in the transformer sensing winding 66a stem only from the shunt capacitances, i.e., the capacitances between the electrodes 16 and 18 and ground, and from the capacitances between adjacent electrodes.

The currents in the sensing transformer primary winding induce corresponding voltages in the secondary winding 66b. The output of the transformer 66 is applied to a stable amplifier 72 and the amplifier output voltage is applied to a phase detector 74 controlled by the signal from the source 56. The phase detector output voltage, applied to another amplifier 65, is essentially free of variations due to the alternating waveform. It does, however, vary according to the amplitude of the voltage across the winding 66b and is hence a square wave having the same frequency as the oscillator 70. Alternate half cycles of this square wave from the phase detector 74 correspond to the sensing transformer primary current when the switches 62 and 68 are in the positions shown; the intermediate half cycles of the square wave correspond to the primary current when the switches are reversed.

This voltage is applied to a further phase detector 78 controlled by the oscillator 70 signal that drives the switches 62 and 68. In response, the detector 70 produces a direct voltage corresponding to the difference between the magnitude of successive half cycles of the square wave from the amplifier 76, i.e., corresponding to the difference function expressed in Eq. (3). This output voltage from the phase detector 78 is dependent substantially exclusively on the capacitance in the tank between the electrodes 16 and 18 and hence is the desired measure of the quantity of liquid in the tank. The voltage is applied to a processing unit 80, which can be a meter, a recorder, or other electrical or electromechanical device depending on the system of which the tank 10 (FIG. 1) is a part.

As noted above, in most instances, the present gage preferably measures liquid quantities with uniform electric fields directed in two, preferably orthogonal, directions on a time- or frequency-sharing basis. The reason for this is as follows.

Consider an elementary capacitor having square, parallel plates with an air dielectric and separated by the plate side length L. When a dielectric block, for example, of dimensions (L×L+½L) is disposed between the plates in such manner that it spans the distance between them and covers one-half the area of each plate, the capacitor has a first value. When the block is rotated 90° to cover the full area of one plate, and thus spans only half the space between the plates, the capacitor has a different value. The difference between the two capacitances stems from differences in the induced charges the field creates at the surfaces of the block for the two orientations of the block relative to the field direction.

Similarly, the present gaging system may exhibit different values of tank capacitance for different orientations and distributions of a given quantity of liquid with respect to the electric field in the tank. This difference in the tank capacitance can result in a small but sometimes noticeable error in the measured liquid mass. However, when the quantity of liquid is determined as the average of the capacitances measured with two orthogonal electric fields, the error is materially reduced. The two-field averaging technique also minimizes errors due to nonuniformities in the electric field.

Figure 6:
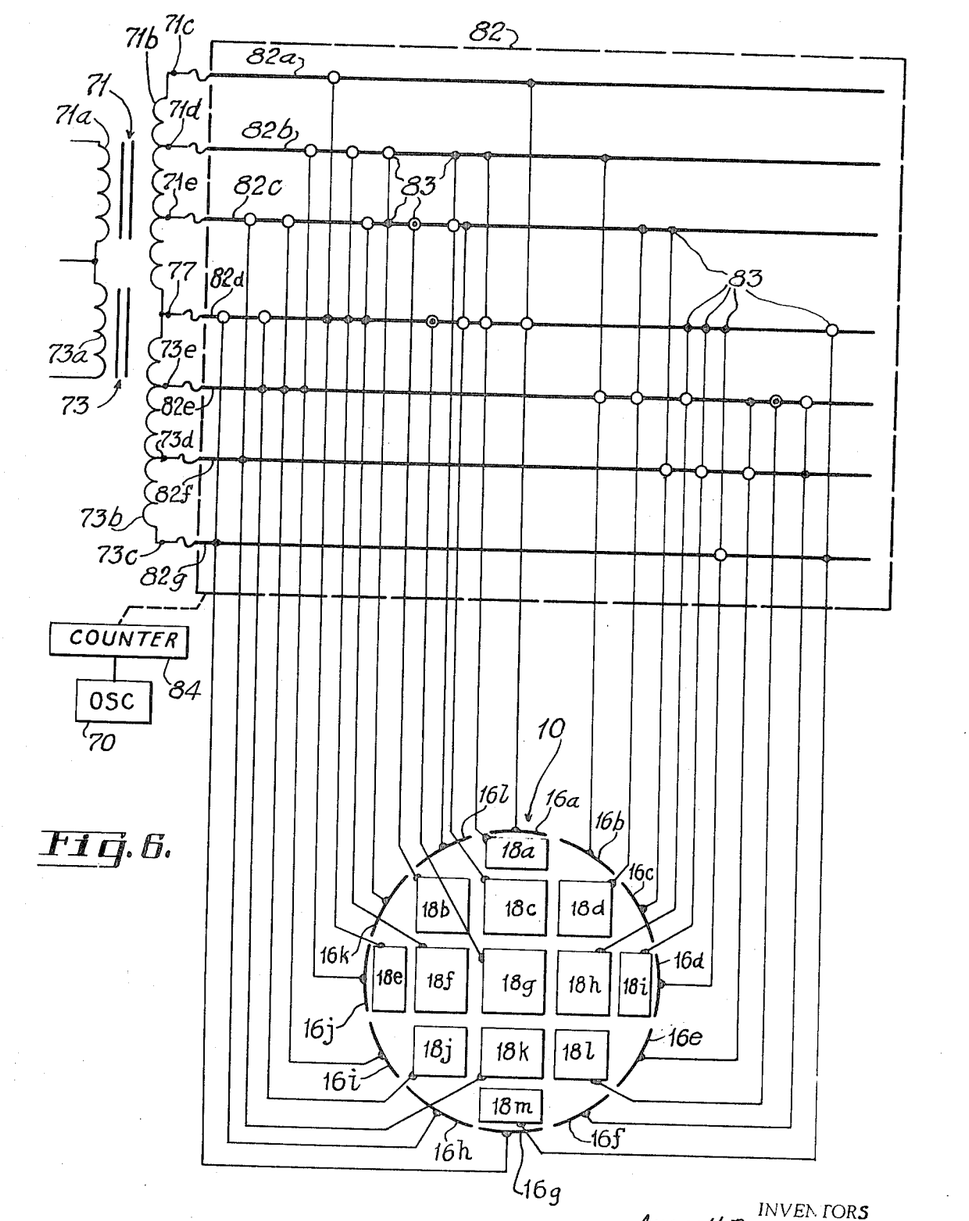
FIG. 6 shows a modification of the FIG. 5 measuring circuit.

To obtain such an averaged measurement, the circuit of FIG. 5 is modified as shown in FIG. 6 by inserting a switching network 82 between the transformer secondary windings 71b and 73b and the electrodes 16 and 18. The switching network 82 is illustrated as a multiple-pole, double-throw switch having movable contacts 82a–82g, each of which is connected to one terminal or tap on the secondary windings 71b and 73b. The switch also has a pair of fixed contacts 83, one indicated with a dot and the other with a circle, for each electrode in the tank.

The switch 82 moves the contacts 82a–82g simultaneously in response to a signal from a counter 84 that is driven with the output from the oscillator 70. It thus reverses its position every time the switch 70 operates the FIG. 5 switches 62 and 68 a selected number of times.

When the switch 82 is in a first position, the contacts connect only to the dot contacts, and when in its other, second, position, the contacts 82 connect only to the circle contacts. Thus, by way of example, when the switch is in the first position, the strip electrode 16a is connected only to the contact 82a and the spot electrode 18j is connected only to the contact 82e. Conversely, when the switch is in its second position, the electrode 16a is connected only to the contact 82d and the electrode 18j is connected only to the contact 82c.

Thus, with the switch 82 fixed contacts 83 connected to the electrodes 16 and 18 as shown in FIG. 6, when the switch is in the first position, the strip and spot electrodes are connected to the transformers 71 and 73 as shown in FIG. 5. The resultant voltages on the electrodes accordingly produce in the tank 10 a field in which the lines of force are parallel to the tank diameter between the electrodes 16a and 16g. On the other hand, when the switch 82 is in its second position, the electrode voltage distribution is rotated 90° clockwise. That is, the strip electrodes 16d and 16j are connected to the transformer end terminals 71c and 73c, respectively, and the electrodes 16a, 16g, 18a, 18c, 18g, 18k and 18m are connected to the grounded terminal point 77. The other electrodes are connected to the taps 71d, 71e, 73d and 73e. The electrodes then develop a horizontal electric field in the tank, i.e., a field in which the lines of force are parallel to the tank diameter between the midpoints of the strip electrodes 16d and 16j.

With further reference to FIGS. 5 and 6, when the switch 82 is interposed between the tank electrodes and the transformers 71 and 73, the processing unit 80 of FIG. 5 averages the measurements made in the two switch positions, i.e., with the two orthogonal fields. The resultant signal identifies the quantity of propellant in the tank with unusually high accuracy.

Alternatively, orthogonal fields can be developed with the described strip and spot electrode configurations by applying the electrode voltages for both fields simultaneously but with different frequencies. The capacitances related to the two fields are then measured at different frequencies. The signals are separated by filters and simultaneously applied to separate detectors whose outputs are averaged together.

Another technique for minimizing errors due to nonuniform distribution of the liquid and to nonuniformities in the electric field is to rotate the electric field in the tank continuously through 360°. This can be done, for example, by energizing the electrodes to produce simultaneously two orthogonal uniform fields with a 90° phase difference between them.

The implementation of these averaging techniques requires that the electrode arrangement be more symmetrical than otherwise. In particular, where the electric field is to have only a single direction, the arrangement of the strip electrodes preferably has 180° symmetry, i.e., it is symmetrical about the equipotential surface at which the potential of the electric field is one-half the algebraic sum of the two extreme potentials applied to the electrodes to produce the field. For convenience, this surface will herein be referred to as the neutral surface of the field.

Further, where the electric field is to have only a single direction, for a given number of electrodes, the most uniform field is generally obtained, to a first approximation, when the strip electrodes do not have uniform width. This is illustrated below with reference to FIGS. 7 and 8.

With further regard to the symmetry of the strip electrodes, where two orthogonal fields are produced, the arrangement of the strip electrodes should have 90° symmetry, i.e., the arrangement should be symmetrical about each of the two orthogonal neutral surfaces associated with the two orthogonal fields. Where the field is rotated through 360°, the strip electrode arrangement should be symmetrical about each neutral surface of the rotating field, i.e., have essentially 360° symmetry. This requires, inter alia that the widths of the strip electrodes be equal, which is the arrangement illustrated in FIG. 1.

Further, for a 360° rotated field, the electrode configuration in the end sections of the FIG. 1 tank 10 should have circular symmetry. That is, the spot electrodes should be confined to areas defined by circles concentric with the circular periphery of the tank cylindrical section and by radial lines extending from the intersection on the end section of the cylindrical axis of the tank. Such a spot electrode pattern can be formed by extending each strip electrode 16 to the apex of the end section with progressively decreasing width and by breaking up each such extension with gaps conforming to the concentric circles noted above.

Figure 7:
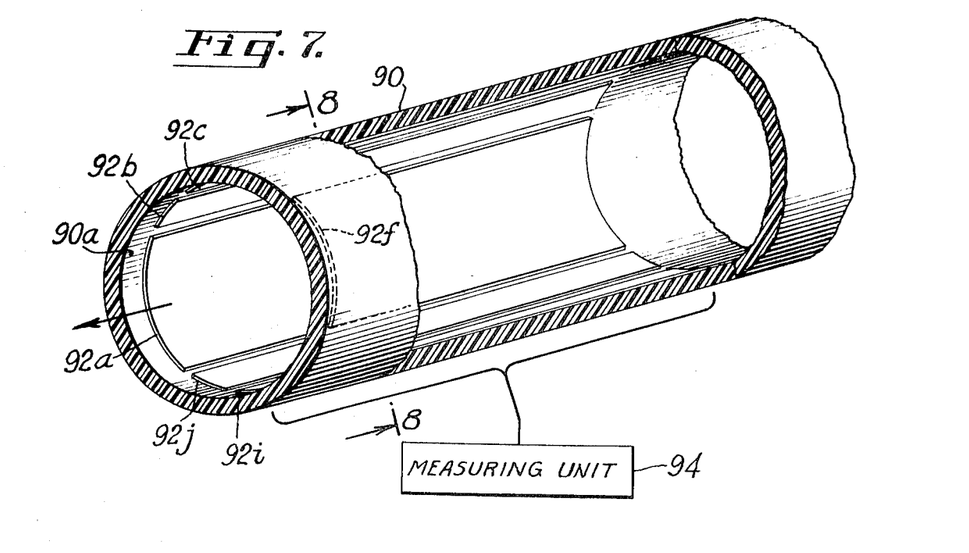
FIG. 7 illustrates the application of the invention to monitoring the density or quality of flow in a pipe.
Figure 8:
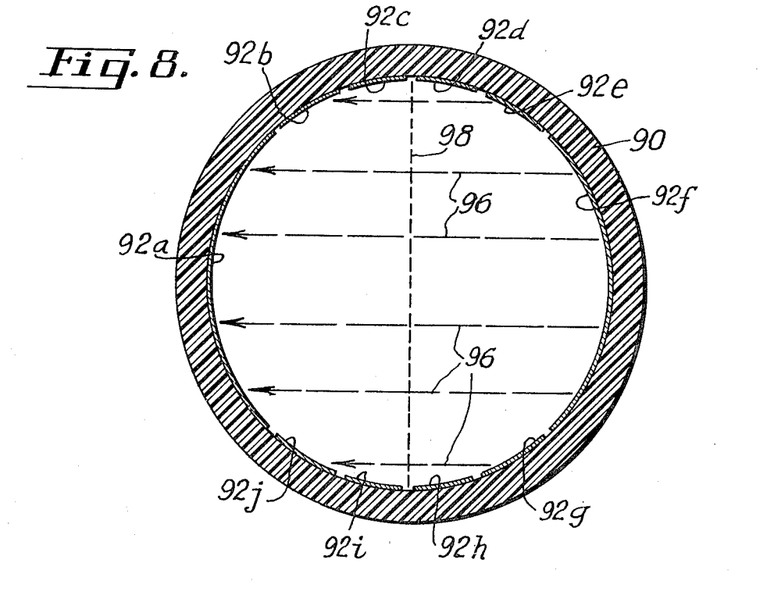
FIG. 8 is a transverse sectional view of the pipe taken along the line 8—8 of FIG. 7.

FIGS. 7 and 8 show a pipe 90 having a pattern of electrodes 92 affixed to its inner surface 90a, which is assumed to be of electrically nonconducting material. The electrodes 92, similar to the strip electrodes 16 in the cylindrical section of the FIG. 1 tank 10, are connected to a measuring unit 94.

The pipe 90 is essentially full of liquid during use and the electrodes 92 and measuring unit 94 are arranged to measure the dielectric constant, $k$, of the liquid flowing past the electrodes. This measurement also determines the density, $\rho$, of the liquid, for the Clausius-Mosotti relation relates these two properties of the fluid, i.e., $$\rho = X \ (k-1/k+2) \qquad (4)$$

where $X$ is a constant.

The mass of the flowing liquid is the product of this measured density times the volume flow rate, which is the product of the pipe cross-sectional area and the velocity of the flow. Hence, the mass is readily determined since the pipe dimensions are essentially invariant and the velocity of flow is known.

This mass measurement is desired, for example, where the temperature of the liquid changes with time, bringing about a change in the density of the liquid. For example, where the pipe carries fuel to an engine or liquid that is to be metered for other purposes, it is often desirable to know the mass rate of flow, rather than the volume rate.

Inasmuch as the illustrated pipe 90 is full of liquid during use, the distribution of the liquid therein is generally uniform and there is usually no need to make measurements with two differently directed electric fields. That is, so long as the pipe is full of liquid, the gaging apparatus of FIG. 7 operates accurately with an electric field oriented only in a single direction. Accordingly, the number of electrodes 92 needs to be divisible only by 2, rather than by 4; 10 electrodes are used in the illustrated arrangement.

Moreover, the widths of the electrodes are not uniform, rather, they are made different to enhance the uniformity of the electric field they develop in the pipe.

FIG. 8 shows the different electrode widths in the pipe 90 for an electric field having force lines 96. The electrode arrangement is determined, at least to a first approximation, by dividing the pipe diameter parallel to the force lines 96 into $\frac{1}{2}(N+2)$ equal segments, where $N$ is the number of electrodes, here 10. Construction lines perpendicular to this diameter are then drawn from the ends of these segments to the pipe inner surface. The intersections on the pipe inner surface of these construction lines are the midpoints of the gaps between the $N$ electrodes, and hence determine the edges of the electrodes.

The resultant electrode arrangement, as shown in FIG. 8, has two diametrically opposed, relatively wide electrodes 92a and 92f. The electrodes 92b, 92e, 92g and 92j adjacent the edges of these electrodes are considerably narrower, and the remaining four electrodes 92c, 92d, 92h and 92i are still narrower. However, the projections of the widths of the electrodes on the diameter parallel to the field lines 96 have equal lengths.

The relative voltages to be applied to these electrodes is, again to a first approximation, $$V_n = [2(2n-1)V_o]/N \qquad (5)$$

where $N$ is an even number equal to the total number of electrodes, and $n$ is an integer identifying the relative position of each electrode from the neutral surface starting with +1 and −1 for the electrodes nearest this surface and on opposite sides thereof. By way of example, in FIG. 8, the neutral surface is indicated with the dotted line 98. The $n$ numbers for the electrodes are:

| $n$ | electrode |
|---|---|
| +1 | 92c, 92i |
| +2 | 92b, 92j |
| +3 | 92a |
| −1 | 92d, 92h |
| −2 | 92e, 92g |
| −3 | 92f |

With further reference to FIGS. 7 and 8, as in the tank 10 if FIG. 1, the electrodes 92 in the pipe 90 are separately connected to the measuring unit 94 (except that electrodes having the same voltage can be connected to the measuring unit in parallel). The leads connected to the electrodes 92 are preferably shielded from the interior of the pipe 90—as with a stripline construction (illustrated in FIG. 3), or with other shielded conductors—so that the electrical potentials on these leads do not affect the electric field within the pipe.

The measuring unit 94 is suitably identical to the measuring unit 20 shown in FIG. 6. One exception is that the measuring unit transformer windings to which the electrodes are connected require only eight taps rather than 10 as shown in FIG. 6.

The present invention can also be used to meter the liquid in a pipe where the liquid is mixed with its own vapor or with another gas. Such a liquid-gas flow is sometimes found in pipes carrying a high-speed turbulent flow. In this instance, the distribution of liquid throughout the pipe cross section may not be uniform. Therefore, the measurement of the quantity of liquid is preferably the average of measurements made with electric fields oriented in different directions, as described above with reference to FIG. 6.

With reference to FIGS. 7 and 8, for such a measurement, the arrangement of electrodes 92 around the pipe inner surface should have 90° symmetry. Hence the number of electrodes should be divisible by 4. The strip electrodes 16 in the cylindrical section of the FIG. 1 tank 10 illustrate a suitable arrangement.

When the FIG. 7 gaging equipment is arranged in this manner and the measuring unit 94 includes circuits for averaging the measurements made with each field direction, the resultant measurement is directly dependent on the quantity of liquid, i.e., mass, in the gaged section of pipe at any instant. The measurement can also be used to determine the quality of flow, i.e., the mass ratio of liquid to gas in the gaged section of pipe.

The instant invention thus provides capacitive gaging equipment that weighs equal masses of liquid equally regardless of the distribution of the liquid globules in the gaged volume. The structure of the gaging equipment is entirely outside the body of fluid being measured. In particular, the gaging equipment employs an array of electrodes disposed on the walls of the fluid container, no gaging structure is required within the body of fluid. The electrodes can, alternatively, be outside the container where the container is of dielectric material.

In the illustrated embodiments, the electrodes extend in general parallel to the equipotential surfaces of a uniform electric field passing through the gaged volume. A source applies a time-varying potential to each electrode equal, to a first approximation, to the potential of that field at the electrode. The electrodes arranged in this manner and energized with these potentials produce an essentially uniform electric field in the gaged volume.

Where the liquid is in a tubular container such as a pipe or tank, it is preferable to have two electrodes opposite each other in the direction transverse to the field so that they are confined between the same two surfaces transverse to the lines of force. These two electrodes can then be energized with the same potential, which simplifies the external circuit.

Further, where the tubular container is closed with end sections, electrodes are preferably disposed at the end sections in banklike paths extending between a pair of opposed electrodes on the tubular container portion. All the electrodes on the same path can then be excited with the same potential. A spherical container can also be considered in this manner, i.e., as having a short tubular center section closed at each end with a spherical end section truncated by half the length of the tubular midsection.

Errors due to the nonuniformity of the field and due to nonuniform distribution of induced charges on the liquid-gas interfaces of liquid globules are minimized by producing two or more electric fields oriented in different, preferably orthogonal, directions on a time- or frequency-sharing basis. The electric field alternatively can be rotated with respect to the gaged volume for the same purpose. The measurements made with different field orientations are averaged to produce the desired measure of the fluid body.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

1. Tank gaging apparatus comprising
   A. a liquid-containing structure having
      1. longitudinal and transverse directions
      2. a longitudinally extending inner surface defining the transverse boundaries of said structure, and 3. a nonrectangular cross section,
B. first and second groups of electrodes,
  1. said electrodes extending longitudinally along said surface,
  2. said electrodes being spaced apart around said surface, and
  3. said groups being opposite each other for generating a uniform electric field.
C. a source of time-varying voltage,
D. means interconnecting said source and electrodes for applying electrical potentials to the respective electrodes, the electrical potential applied to each electrode being substantially equal to the potential at the location of that electrode in a first uniform field extending from said first group to said second group, and
E. output means responsive to the current from said source to said electrode groups.

2. Apparatus according to claim 1 wherein
A. further electrodes are arranged in third and fourth groups opposite each other for generating a uniform electric field along a second direction transverse to a first direction between said first and second groups,
B. said interconnecting means additionally including means for applying electrical potentials to the respective electrodes in said third and fourth groups, the electrical potential applied to each electrode being substantially equal to the potential developed at the location of that electrode in a second uniform electric field extending between said third and fourth groups, and
C. further comprising means for producing an output signal corresponding to the currents from said source for generating said first electric field and said second electric field.

3. Apparatus according to claim 1 wherein said output means additionally includes means for subtracting from said current a current substantially equal to the current to said electrodes when said tank is empty of liquid.

4. Tank gaging apparatus comprising
A. a liquid-containing structure having
  1. longitudinal and transverse directions
  2. a longitudinally extending inner surface defining the transverse boundaries of said structure
B. first and second groups of electrodes
  1. said electrodes extending longitudinally along said surface
  2. said electrodes being spaced part around said surface
  3. said groups being opposite each other for generating a uniform electric field
C. a source of time-varying voltage,
D. means interconnecting said source and said electrodes for applying electrical potentials to the respective electrodes, the electrical potential applied to each electrode being substantially equal to the potential at the location of that electrode in a uniform field extending from said first group to said second group,
E. further electrodes being arranged in third and fourth groups along a second direction transverse to said first direction for generating a second uniform electric field
F. said interconnecting means further including means for applying electrical potentials to the respective electrodes in said third and fourth groups, the electrical potential applied to each electrode being substantially equal to the potential at the location of that electrode by a second uniform electric field transverse to said first field and extending between said third and fourth groups of electrodes, and
G. means for producing a signal proportional to the average of the currents from said source to said
  1. first and second groups, and
  2. said third and fourth groups.

5. Tank gaging apparatus comprising
A. a liquid-containing structure having
  1. longitudinal and transverse directions
  2. a longitudinally extending inner surface defining the transverse boundaries of said structure, B. first and second groups of electrodes,
  1. said electrodes extending longitudinally along said surface,
  2. said electrodes being spaced apart around said surface
  3. said groups being opposite each other for generating a uniform electric field
C. a source of time-varying voltage
D. transformer means connected between said source and said electrodes, said transformer means having primary means and multiple-tapped secondary means for applying electrical potentials to the respective electrodes, the electrical potential applied to each electrode being substantially equal to the potential at the location of that electrode in a uniform field extending from said first group to said second group,
E. switching means
  1. having first and second alternate conditions
  2. connected to said primary means so that in said first condition it connects said transformer means to normally energize said electrodes to provide said potentials at said electrodes, and
  3. in said second condition said transformer means energize both of said electrode groups with the same potential so that current to said electrodes corresponds to the stray capacitance of said electrodes,
F. means sensing the current applied to said transformer means means in each condition of said switching means,
G. a reference capacitor connected to said primary means to provide a reference current when said switching means is in said first condition corresponding in magnitude to, and having the opposite phase from, the current produced in said sensing means when said volume is empty of liquid, and
H. means coupled to said transformer means and said switching means for producing a signal corresponding to the difference between the currents in said sensing means when said switching means is alternated between said first and second conditions.

6. Apparatus according to claim 5 wherein said switching means includes means for generating a voltage changing in amplitude between first and second values in synchronism with the operation of said switching means between said first and second conditions and said difference signal producing means comprises
A. a first phase detector coupled to said sensing means and said source for receiving a voltage corresponding to sensed currents and a voltage corresponding to the source voltage applied to said transformer means, and
B. a second phase detector coupled to said first phase detector and said switching means for receiving a voltage corresponding to the voltage output from said first phase detector and the voltage from said switching means.

7. Apparatus for measuring the quantity of a liquid, said apparatus comprising
A. a cylindrical tank having a cylindrical wall and closed on at least one end by an outwardly extending bulbous closure,
B. longitudinally extending electrodes mounted along the inner surface of said cylindrical wall,
C. electrodes mounted on the inner surface of said end closure,
D. an electrical source,
E. means interconnecting said source and said electrodes for applying electrical potentials to the respective electrodes, the electrical potential applied to each electrode being substantially equal to the potential at the location of that electrode in a uniform electric field passing through said tank from one side to the other, and
F. output means responsive to the combined currents to said electrodes.

8. Apparatus as defined in claim 7 in which said interconnecting means
A. applies electrical potentials of opposite polarities to the respective electrodes on opposite sides of a diameter of said tank, B. the magnitude magnitude of each of said potentials being substantially proportional to the cosine of the angle between a first radius perpendicular to said diameter and a second radius extending from the axis of said tank to said electrode.

9. Apparatus for measuring the mass of liquid in a container of known volume, said container being substantially cylindrical and having a first diameter, a second diameter perpendicular to said first diameter and having a height dimension on the axial direction of the container, said apparatus comprising A. a plurality of electrodes
 1. secured to the container inner surface,
 2. spaced apart circumferentially around said surface and insulated from each other,
 3. distributed substantially throughout said surface,
B. source means connected with said electrodes for applying time-varying voltages to each electrode, each voltage from said source means being measurable with reference to a ground potential,
 1. the voltage with respect to the ground potential applied to each electrode corresponding to the function ($V_o$ cosine $\phi$) where ($V_o$) is one-half the voltage applied between the pair of electrodes having the maximum spacing along said first diameter, and ($\phi$) is the angle corresponding to the position of each electrode as measured between (a) said first diameter and (b) a construction line extending from the intersection of said first surface and said first diameter to the middle of that electrode along the circumference of said container, the voltages applied to the respective electrodes on opposite sides of said second diameter having opposite polarities, and
C. output means responsive to the current said source means applies to said electrodes to maintain said voltages thereat.

* * * * *